US010956188B2

(12) United States Patent
Busaba et al.

(10) Patent No.: US 10,956,188 B2
(45) Date of Patent: Mar. 23, 2021

(54) TRANSPARENT INTERPRETATION OF GUEST INSTRUCTIONS IN SECURE VIRTUAL MACHINE ENVIRONMENT

(71) Applicant: INTERNATIONAL BUSINESS MACHINES CORPORATION, Armonk, NY (US)

(72) Inventors: Fadi Y. Busaba, Poughkeepsie, NY (US); Lisa Cranton Heller, Rhinebeck, NY (US); Jonathan D. Bradbury, Poughkeepsie, NY (US); Christian Borntraeger, Stuttgart (DE); Claudio Imbrenda, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 16/296,316

(22) Filed: Mar. 8, 2019

(65) Prior Publication Data

US 2020/0285494 A1 Sep. 10, 2020

(51) Int. Cl.
*G06F 9/455* (2018.01)
(52) U.S. Cl.
CPC ...... *G06F 9/45545* (2013.01); *G06F 9/45558* (2013.01); *G06F 2009/45562* (2013.01);
(Continued)
(58) Field of Classification Search
CPC ............. G06F 9/45545; G06F 9/45558; G06F 2009/45562; G06F 2009/45575; G06F 2009/45587; G06F 2009/45595
See application file for complete search history.

(56) References Cited

U.S. PATENT DOCUMENTS

| 5,896,499 A | 4/1999 | McKelvey |
| 7,725,559 B2 | 5/2010 | Landis et al. |

(Continued)

FOREIGN PATENT DOCUMENTS

| CN | 102811239 A | 12/2012 |
| CN | 105184147 A | 12/2015 |

(Continued)

OTHER PUBLICATIONS

International Search Report; International Application No. PCT/IB2020/051667; International Filing Date: Feb. 27, 2020; dated Jun. 4, 2020; 9 pages.

(Continued)

*Primary Examiner* — Diem K Cao
(74) *Attorney, Agent, or Firm* — Cantor Colburn LLP; Steven Chiu

(57) ABSTRACT

According to one or more embodiments of the present invention, a computer implemented method includes executing, by a virtual machine that is executing on a host server, a stream of instructions, wherein an instruction from the stream of instructions is to be intercepted to a hypervisor. The method further includes, based on a determination that the virtual machine is a secure virtual machine, preventing the hypervisor from directly accessing any data of the secure virtual machine. The method further includes performing by a secure interface control of the host server, based on a determination that the instruction is not interpretable by the secure interface control itself, extracting one or more parameter data associated with the instruction from the secure virtual machine, and storing the parameter data into a buffer that is accessible by the hypervisor. The instruction is subsequently intercepted into the hypervisor.

25 Claims, 6 Drawing Sheets

(52) U.S. Cl.
CPC .............. *G06F 2009/45575* (2013.01); *G06F 2009/45587* (2013.01); *G06F 2009/45595* (2013.01)

(56) References Cited

U.S. PATENT DOCUMENTS

| | | | |
|---|---|---|---|
| 7,984,108 B2 | 7/2011 | Landis et al. | |
| 8,370,641 B2 | 2/2013 | Henry et al. | |
| 8,656,482 B1 | 2/2014 | Tosa | |
| 9,436,576 B2 | 9/2016 | Zhu et al. | |
| 9,483,639 B2 | 11/2016 | Sliwa et al. | |
| 9,672,058 B2 | 6/2017 | Sliwa et al. | |
| 9,948,640 B2 | 4/2018 | Ignatchenko et al. | |
| 2008/0059556 A1 | 3/2008 | Greenspan et al. | |
| 2010/0115291 A1 | 5/2010 | Buer | |
| 2011/0271279 A1 | 11/2011 | Pate | |
| 2011/0302400 A1 | 12/2011 | Maino et al. | |
| 2015/0127866 A1 | 5/2015 | Zeng | |
| 2015/0277947 A1 | 10/2015 | Busaba et al. | |
| 2016/0085568 A1 | 3/2016 | Dupre et al. | |
| 2016/0132345 A1* | 5/2016 | Bacher .................... | G06F 9/542 718/1 |
| 2017/0177398 A1 | 6/2017 | Bacher | |
| 2017/0351601 A1 | 12/2017 | Matsuzawa | |
| 2018/0165224 A1 | 6/2018 | Brown et al. | |
| 2018/0173645 A1* | 6/2018 | Parker ................. | G06F 12/0646 |
| 2018/0247082 A1 | 8/2018 | Durham et al. | |
| 2018/0330081 A1 | 11/2018 | Hua | |
| 2020/0117624 A1 | 4/2020 | Kumar | |
| 2020/0134171 A1 | 4/2020 | Li | |
| 2020/0285495 A1 | 9/2020 | Imbrenda et al. | |

FOREIGN PATENT DOCUMENTS

| | | |
|---|---|---|
| CN | 105184164 A | 12/2015 |
| KR | 20130000253 A | 1/2013 |
| WO | 2014081611 A3 | 5/2014 |

OTHER PUBLICATIONS

"System and Method of Identifying a Hypervisor Configuration Using Exposed Application Programming Interfaces to Seed a Results Engine"; IP.com No. IPCOM000234597D; IP.com Publication Date: Jan. 21, 2014; 8 Pages.

"Virtualisation of Embedded SW Components for Protection, Control and Monitoring Systems in Electrical Power Networks"; IP.com No. IPCPM000176089D; IP.com Publication Date: Nov. 5, 2008; 4 Pages.

Boivie et al.; Hardware Support for Malware Defense and End-to-End Trust; International Business Machines Corporation TJ Watson Research Center Yorktown Heights United States; 2017; 81 Pages.

Borntraeger et al., "Secure Interface Control High-Level Instruction Interception for Interruption Enablement," U.S. Appl. No. 16/296,452, filed Mar. 8, 2019.

Burtsev; "CS5460/6460: Operating Systems—Lecture 6: Interrupts and Exceptions"; Jan. 2014; 36 Pages.

Imbrenda et al., "Inject Interrupts and Exceptions Into Secure Virtual Machine," U.S. Appl. No. 16/296,332, filed Mar. 8, 2019.

Disclosed Anonymously; "System and Method for Segmenting a VM into Logical Security Zones"; IP.com No. IPCOM000232145D; IP.com Publication Date: Oct. 21, 2013; 5 Pages.

Disclosed Anonymously; "System and Method to Secure Virtual Machines in a Cloud Deployment"; IP.com No. IPCOM000250505D; IP.com Publication Date: Jul. 26, 2017; 4 Pages.

Li et al.; "Secure Virtual Machine Execution Under an Untrusted Management OS"; 2010 IEEE 3rd International Conference on Cloud Computing; IEEE; 2010; pp. 172-179.

List of IBM Patents or Patent Applictions Treated as Related; Appendix P; Date Filed Jun. 20, 2019; 2 Pages.

Siemens et al.; "Method of Saving and Restoring the State of a Virtual Machine Guest Controller Software in Case of Failure/Crash or User Request"; IP.com No. IPCOM000205582D; IP.com Publication Date: Mar. 31, 2011; 5 Pages.

Yakovlev; "Hypervisor Security"; DEFCON NN; 2017; pp. 1-46.

Abel Gordon et al: "ELI", Proceedings of the 7th International Conference on Architectural Support of Programming Languages and Operation Systems, ASPLOS'12, Mar. 3-7, 2012, p. 411.

International Search Report; International Application No. PCT/EP2020/055127; International Filing Date: Feb. 27, 2020; dated May 15, 2020; 9 pages.

Zhang Wang et al: "A survey of direct interrupt delivery techniques in I/O virtualization", 2017 8th IEEE International Conference on Software Engineering and Service Science (ICSESS), IEEE, Nov. 24, 2017 (Nov. 24, 2017), pp. 169-172, XP033333610, DOI: 10.1109/ICSESS.2017.8342889 [retrieved on Apr. 19, 2018] p. 169-p. 170.

Futagami, "Secure Out-of-band Remote Management of Virtual Machines with Transparent Passthrough" 2018, ACM (Year: 2018).

\* cited by examiner

TRANSPARENT INTERPRETATION OF GUEST INSTRUCTIONS IN SECURE VIRTUAL MACHINE ENVIRONMENT

BACKGROUND

The present application relates to computer technology, and more specifically, to virtual machines.

Cloud computing facilitates the ability to provision a virtual machine for a customer quickly and easily, without requiring the customer to purchase hardware or provide floor space for a physical server. The customer may expand or contract the virtual machine according to changing preference(s). Typically, the cloud computing provider provisions the virtual machine, which is physically resident at the provider's datacenter. In this environment, the customer's virtual machine is running as a guest and the cloud provider uses hypervisor code running as a host to virtualize the server resources between multiple virtual machines, possibly belonging to different customers.

Customers are often concerned about the security of data in the virtual machine. Cloud operators may not be trusted and customers may want to deploy their work without the risk of being compromised by malicious or broken code (like hypervisor) and/or a system administrator with malicious intent operating the datacenter. For example, a customer may request that cloud providers do not have access to their data, so as to reduce or avoid the possibility that the cloud computing provider, such as a United States (U.S.) company is forced, possibly through subpoena, to turn over confidential or proprietary documents.

SUMMARY

According to one or more embodiments of the present invention, a computer implemented method includes executing, by a virtual machine that is executing on a host server, a stream of instructions, wherein an instruction from the stream of instructions is to be intercepted to a hypervisor. The method further includes, based on a determination that the virtual machine is a secure virtual machine, preventing the hypervisor from directly accessing any data of the secure virtual machine. The method further includes performing by a secure interface control of the host server, based on a determination that the instruction is not interpretable by the secure interface control itself, extracting one or more parameter data associated with the instruction from the secure virtual machine, and storing the parameter data into a buffer that is accessible by the hypervisor. The instruction is subsequently intercepted into the hypervisor.

According to one or more embodiments of the present invention, the method further includes performing by a secure interface control of the host server, based on a determination that the instruction is interpretable by the secure interface control itself, executing the instruction by the secure interface control, and returning execution control back to the secure virtual machine for continuing execution of the stream of instructions.

According to one or more embodiments of the present invention, intercepting the instruction includes setting, by the secure interface control, a first flag that is indicative that the instruction is partially complete, and setting, by the secure interface control, a second flag that is indicative that the secure virtual machine is locked for execution.

According to one or more embodiments of the present invention, the method further includes, based on a determination by the secure interface control that the instruction causes a program exception when executed, presenting the exception to the secure virtual machine rather than intercepting the instruction into the hypervisor.

According to one or more embodiments of the present invention, the method further includes, upon completion of execution of the instruction by the hypervisor, updating, by the secure interface control, a state of the secure virtual machine with a response from the hypervisor, at least a portion of the state being stored in a secure portion of memory that is not accessible by the hypervisor.

According to one or more embodiments of the present invention, the hypervisor stores the response for the instruction in a dedicated buffer.

According to one or more embodiments of the present invention, the method further includes, upon completion of the execution, based on a determination that the response generated by the hypervisor is not valid, intercepting, by the secure interface control, an error condition to the hypervisor.

According to one or more embodiments of the present invention the secure interface control includes millicode.

Further, according to one or more embodiments of the present invention the above described features are provided at least by a system, a computer program product, and a machine.

According to one or more embodiments of the present invention, a computer-implemented method includes executing, by a hypervisor on a host machine, a guest instruction from a secure virtual machine, the hypervisor prohibited from directly accessing any data of the secure virtual machine. The method further includes storing, by the hypervisor, a response to the guest instruction in a predetermined buffer. The method further includes updating, by a secure interface control of the host machine, a state descriptor of the secure virtual machine with the response by copying the response into a designated register in the state descriptor, the state descriptor being stored in a secure portion of memory that is not accessible by the hypervisor.

According to one or more embodiments of the present invention, the method further includes, based on a determination that the response generated by the hypervisor is not valid, intercepting, by the secure interface control, an error condition to the hypervisor.

According to one or more embodiments of the present invention, the method further includes, resetting, by the secure interface control, a first flag associated with the secure virtual machine, the reset is indicative that the secure virtual machine can be dispatched to continue execution of an instruction stream.

The features of the above method can also be provided at least by a system, a computer program product, and a machine.

The features described herein provide improvements to computer technology, particularly, computer servers that host virtual machines (VMs) by facilitating the computer servers to host secure VMs. In the case of secure VMs the hypervisor is no longer trusted with control of the VM's data, and even the hypervisor is prohibited from accessing memory, registers, and other such data associated with the secure VM. Additionally, technical features described herein facilitate the host computer servers to facilitate a separation of the secure VM and the hypervisor, and thus maintain security of the VMs hosted by the computing server.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
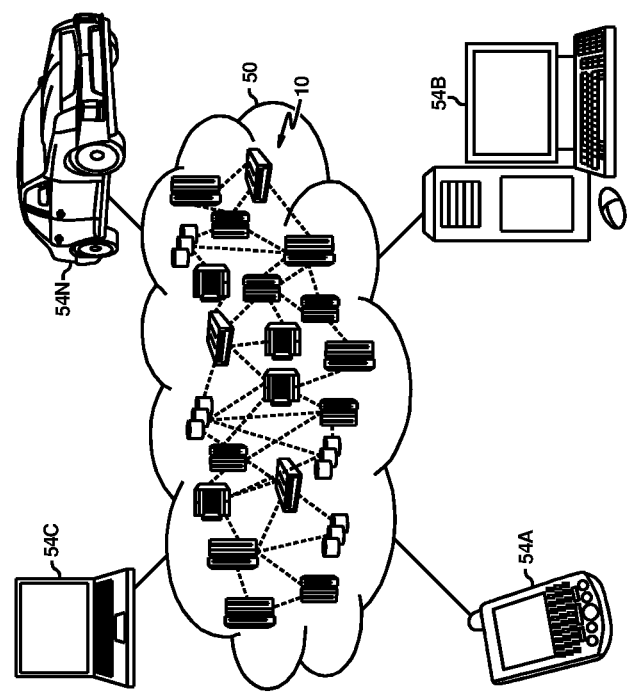
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A technical challenge regarding typical cloud environments is the potentially unsecure and unwanted access to data and algorithms (e.g., by a cloud provider or cloud administrator). The cloud provider typically runs hypervisor code as the host with the customers' VMs as running as guests. This hypervisor code provides the virtualization function required to allow multiple VMs to run on a single physical machine. In existing systems, the hypervisor (and often by extension the cloud administrator) has access to customers' data and algorithms for situations where it must access limited portions of that data to provide a virtualization function. For example, cloud providers may dump memory to analyze performance and functional problems in the system. The dumped memory may include customer secrets that a customer does not wish to expose. The system operator is also able to display the internal processor register state that also exposes secrets. Hypervisors are required to access guest data, for example, to interpret guest instructions, and to do I/O operations on behalf of the guest, along with other reasons. Hypervisor access to guest memory is needed in order to provide guest functional correctness. In secure execution, as is used by one or more embodiments of the present invention, the hypervisor is no longer trusted but can still participate in guest instruction interpretation. Accordingly, one or more embodiments of the present invention provide a way for non-trusted hypervisor to securely emulate guest instructions.

A virtual machine, running as a guest under the control of a host hypervisor, relies on that hypervisor to transparently provide virtualization services for that guest. These services can include, but are not limited to memory management, instruction emulation, and interruption processing. One or more embodiments of the present invention can apply to any interface between a secure entity and another untrusted entity that traditionally allows access to the secure resources by this other entity. For example, for interruption and exception interpretation the hypervisor typically reads and/or writes into a prefix area (low core) of the guest. The term "virtual machine" or "VM" as used herein refers to a logical representation of a physical machine (computing device, processor, etc.) and its processing environment (operating system (OS), software resources, etc.) The virtual machine state is maintained by the hypervisor that executes on an underlying host machine (physical processor or set of processors). From the perspective of a user or software resource, the virtual machine appears to be its own independent physical machine. The terms "hypervisor" and "VM Monitor (VMM)" as used herein refer to a processing environment or platform service that manages and permits multiple VM's to execute using multiple (and sometimes different) OS's on a same host machine. It should be appreciated that deploying a VM includes an installation process of the VM and an activation (or starting) process of the VM. In another example, deploying a VM includes an activation (or starting) process of the VM (e.g., in case the VM is previously installed or already exists).

However, for facilitating secure guests, a technical challenge exists where the computing server, such as the hosting node, has to provide added security between the hypervisor and the secure guests, such that the hypervisor cannot access data from the VM, and hence, cannot provide services in the way described above.

In presently available technical solutions, the hypervisor (e.g., z/VM® by IBM® or open source software Kernel Based Virtual machine (KVM)) dispatches a new VM virtual CPU (vCPU) on a physical processing unit, or host server, by issuing a Start-Interpretive-Execution (SIE) instruction which causes the SIE Entry millicode to be invoked. The operand of the SIE instruction is a control block, referred to as the state description (SD), which contains the guest state. In existing implementations, this state description resides in hypervisor storage. During SIE Entry, this guest state (including general purpose and control registers, guest instruction-address and guest program-status-word (PSW)) is loaded by millicode into the hardware. This allows the guest vCPU to run on the physical processor. While the vCPU is running on the hardware, the guest state is maintained in the hardware. At some point, the hardware/millicode must return control back to the hypervisor. This is often referred to as SIE Exit. This may be required, for example, if this vCPU executes an instruction which requires emulation by the hypervisor or if the vCPU time-slice (i.e., the time allocated for this vCPU to run on the physical processor) expires. During SIE Exit, since the hardware has resources to support only a single vCPU at any given time and it must now load the hypervisor state into the hardware, the millicode saves the current guest state in the state description. While this vCPU is not dispatched, its state is maintained in the state description. Since this state description lies within hypervisor storage, the hypervisor, in such cases, has control of the data for the VM, and in some cases such control is required to interpret instructions being executed on the VM. Existing hypervisors rely on using such an interface through the SIE instruction to dispatch vCPUs.

Further, the hypervisor that is managing multiple VMs has to interpret guest instructions, that is, instructions that are executing on a VM. As part of this interpretation, the hypervisor typically, in existing solutions, has full access to the SD and other data of the VM, the SD and the data being stored in memory that is part of a host machine that is executing the hypervisor. It should be noted that not all instructions that are executed on the VM require interpretation by the hypervisor. Typically, instructions that require system-level access, such as I/O access, require such hypervisor interpretation. Such guest instructions requiring hypervisor interpretation cause a SIE Exit interception (interruption of guest instruction stream) out from guest mode to the hypervisor. The hypervisor then checks which instruction caused the interception and interprets it by reading and/or writing corresponding guest data present in guest registers or in guest memory. The intercepted VM is then re-dispatched to continue executing its instruction stream.

It should be noted that typically, cases for "instruction interception" include an operating system of the VM issuing a CPUID instruction to identify the hardware characteristics, accessing machine-specific registers (MSRs), or accessing I/O ports directly. When such instructions requiring interception are detected, control is immediately transferred to the hypervisor 12 to resolve. For example, if the VM issues an instruction to read or update a Control Register (CR) or a Machine-Specific Register (MSR) value, in some cases this operation is intercepted, and control is transferred to the hypervisor 12 where the behavior of the VM is simulated by the hypervisor which requires accessing one or more data values from a state descriptor of the VM. Further, intercepted operations can also include host program exceptions, which are be handled by the hypervisor 12.

In the case of a secure VM, when the hypervisor is no longer trusted with control of the secure VM's data, traditional interpretation of guest instructions is no longer possible. This technical challenge exists because the hypervisor has no access to guest data (registers and its memory). Even if the hypervisor is given a limited guest state access, the hypervisor cannot observe a behavior of the secure VM in order to prevent or limit side-channel attacks. Thus, the technical challenge for the hosting node is to facilitate the secure interface control and/or the hypervisor to interpret and execute guest instructions in a secure VM when the VM has limited "power", or "authority" to access the system resources of the hosting node, for example, I/O devices, and the like.

According to one or more embodiments of the present invention technical solutions are described to interpret instructions in a secure VM without exposing guest data to the hypervisor and without the need to rewrite guest applications or operating system. In other words, the interpretation of the guest instructions by the millicode and hypervisor is transparent to the secure VM itself. Accordingly, existing applications and operating systems can be used as is, and the hosting node and hypervisor that provide such secure VMs are compatible with existing products. In other words, one or more embodiments of the present invention address technical challenges by facilitating that the existing VM, operating system and computer application code does not have to change and that code can be used in hosting nodes and/or hypervisors that also dispatch VMs in a secure manner that prohibits the hypervisor from accessing state and/or data of the secure VM. One or more embodiments of the present invention facilitate such technical solutions by using an improved underlying implementation of guest instruction interpretation in a secure interface control (e.g. millicode) that is going to interpret the guest instructions for the secure VM.

In one or more examples, such functionality can be provided by using millicode and/or other hardware modules, and in the present description the hardware modules and the millicode are collectively referred to as a "secure interface control". Accordingly, one or more embodiments of the present invention facilitate the hypervisor for the secure interpretation of instructions in a secure VM by a non-trusted hypervisor through the use of the secure interface control (millicode and internal trusted hardware and firmware). The secure interface control coordinates the execution of the instruction between the secure VM and the non-trusted hypervisor. The guest instruction is intercepted as in a non-secure VM but control is not immediately given back to the hypervisor, rather the control is first given to the secure interface control, which extracts the necessary guest data and passes it along with interception condition for the guest instruction and additional context information to the hypervisor. The hypervisor processes the request and returns the response to the secure interface control. The secure interface control will then update the guest state, as needed, depending on the intercepted instruction. Accordingly, the secure interface control isolates the hypervisor from the data of the secure VM, improving the security of the data associated with the secure VM.

A brief description of background technology now follows, after which, particular features used by one or more embodiments of the present invention for injecting interrupts and/or exceptions into secure VMs by a hypervisor are described. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
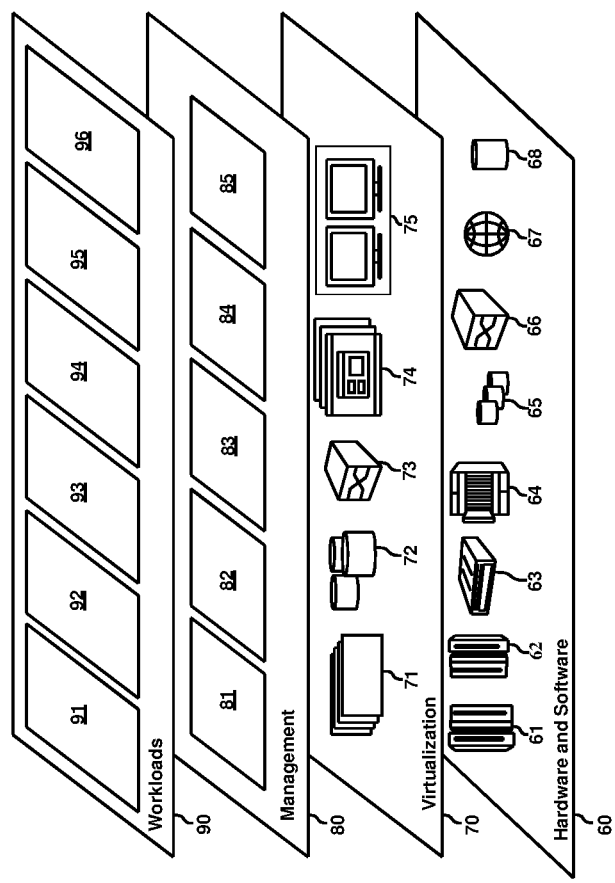
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual machines 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source-code versioning 96. It is understood that these are just some examples and that in other embodiments, the layers can include different services.

Figure 3:
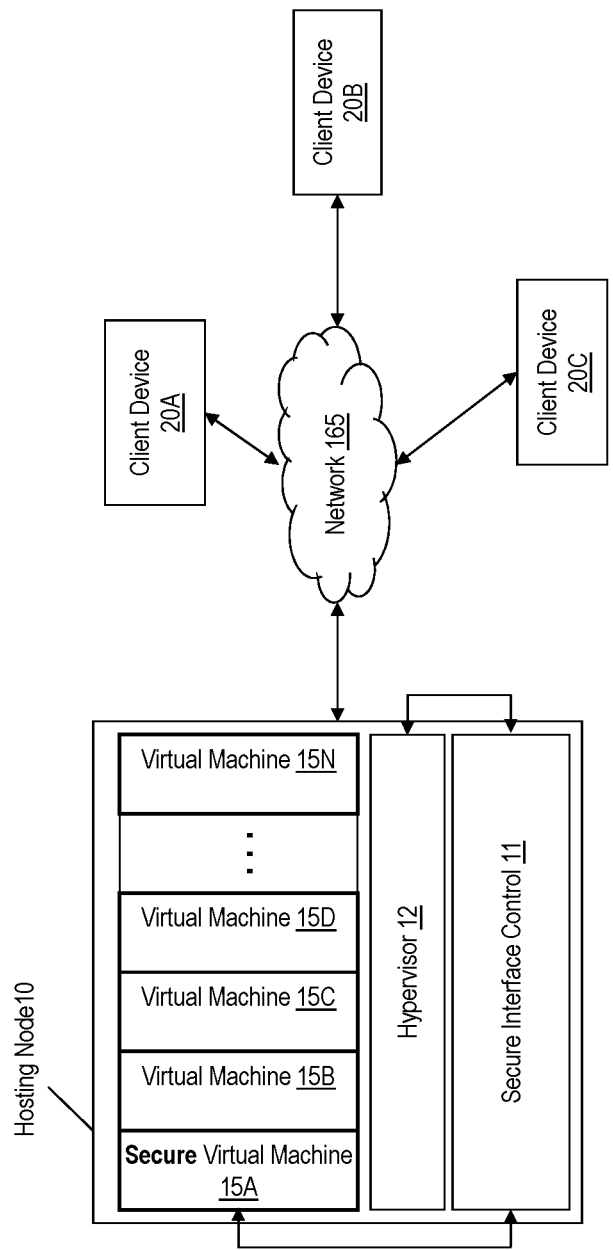
FIG. 3 illustrates an example system for hosting system, in accordance with an embodiment.

FIG. 3 illustrates an example hosting node 10 according to one or more embodiments of the present invention. The hosting node 10 is in communication with one or more client devices 20A-20C via a network 165. In addition, client devices 20A-20C can have direct communication with hosting node 10. The hosting node 10 can be a datacenter or host server, of a cloud-computing provider. The hosting node 10 executes a hypervisor 12, which facilitates deploying one or more virtual machines 15 (15A-15N). The hosting node 10 further includes the secure interface control 11 that includes one or more hardware modules and millicode that facilitates the hypervisor 12 to provide one or more services to the virtual machines 15. In existing technical solutions, there are communications between hypervisor 12 and the secure interface control 11; the secure interface control 11 and one or more VMs 15; the hypervisor 12 and the one or more VMs 15; and the hypervisor 12 to VMs 15 through the secure interface control 11. To facilitate a secure VM environment, the hosting node 10 according to one or more embodiments of the present invention, does not include any direct communications between the hypervisor 12 and the one or more VMs 15.

For example, the hosting node 10 can facilitate a client device 20A to deploy one or more of the virtual machines 15A-15N. The virtual machines 15A-15N may be deployed in response to respective requests from distinct client devices 20A-20C. For example, the virtual machine 15A may be deployed by the client device 20A, the virtual machine 15B may be deployed by the client device 20B, and the virtual machine 15C may be deployed by the client device 20C. The hosting node 10 may also facilitate a client to provision a physical server (without running as a virtual machine). The examples described herein embody the provisioning of resources in the hosting node 10 as part of a 'virtual machine,' however, the technical solutions described can be applied to provision the resources as part of a physical server.

In an example, the client devices 20A-20C may belong to the same entity, such as a person, a business, a government agency, a department within a company, or any other entity, and the hosting node 10 may be operated as a private cloud of the entity. In this case, the hosting node 10 solely hosts virtual machines 15A-15N that are deployed by the client devices 20A-20C that belong to the entity. In another example, the client devices 20A-20C may belong to distinct entities. For example, a first entity may own the client device 20A, while a second entity may own the client device 20B. In this case, the hosting node 10 may be operated as a public cloud that hosts virtual machines from different entities. For example, the virtual machines 15A-15N may be deployed in a shrouded manner in which the virtual machine 15A does not facilitate access to the virtual machine 15B. For example, the hosting node 10 may shroud the virtual machines 15A-15N using an IBM z Systems® Processor Resource/Systems Manager (PR/SM) Logical Partition (LPAR) feature. These features, such as PR/SM LPAR provide isolation between partitions, thus facilitating the hosting node 10 to deploy two or more virtual machines 15A-15N for different entities on the same physical hosting node 10 in different logical partitions.

A client device 20A from the client devices 20A-20C is a communication apparatus such as a computer, a smartphone, a tablet computer, a desktop computer, a laptop computer, a server computer, or any other communication apparatus that requests deployment of a virtual machine by the hypervisor 12 of the hosting node 10. The client device 20A may send a request for receipt by the hypervisor via the network 165 or directly. A virtual machine 15A, from the virtual machines 15A-15N is a virtual machine image that the hypervisor 12 deploys in response to a request from the client device 20A from the client devices 20A-20C. The hypervisor 12 is a virtual machine monitor (VMM), which may be software, firmware, or hardware that creates and runs virtual machines. The hypervisor 12 facilitates the virtual machine 15A to use the hardware components of the hosting node 10 to execute programs and/or store data. With the appropriate features and modifications the hypervisor 12 may be IBM z Systems®, ORACLE VM SERVER™, CITRIX XEN-SERVER™, VMWARE ESX™ MICROSOFT HYPER-V™, or any other hypervisor. The hypervisor 12 may be a native hypervisor executing on the hosting node 10 directly, or a hosted hypervisor executing on another hypervisor.

Figure 4:
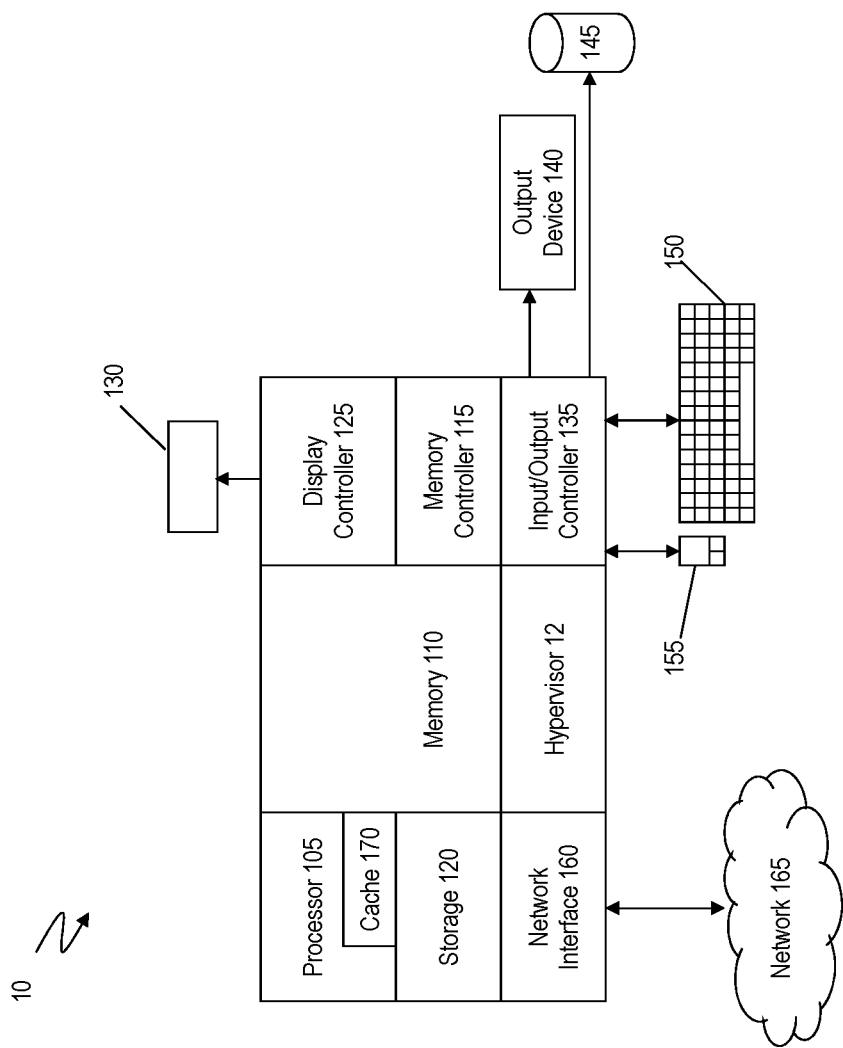
FIG. 4 illustrates an example block diagram of a hosting system, in accordance with an embodiment.

FIG. 4 illustrates components of an example hosting node according to one or more embodiments of the present invention. The hosting node 10 may be a computer, such as a server computer, a desktop computer, a tablet computer, a smartphone, or any other computer that executes the hypervisor 12, which in turn deploys the virtual machines 15A-15N. The hosting node 10 includes components that include hardware, such as electronic circuitry. The hosting node 10 includes, among other components, a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the hosting node 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on).

The memory 110 may include one or combinations of volatile memory elements (for example, random access memory, RAM, such as DRAM, SRAM, SDRAM) and nonvolatile memory elements (for example, flash memory, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS), which executes the hypervisor 12. The operating system may control the execution of other computer programs and provides scheduling, input-output control, file and data management, memory management, and communication control and related services. In an example, such as the z System™, a manufacturer of the hosting node 10 may provide the hypervisor 12. In the case of a system with a structure unlike that of z System, where the hypervisor 12 is not provided by the hardware manufacturer, the cloud computing provided may use a hypervisor 12 such as from VMWARE™, or other hypervisor providers. In an example, the administrator of the physical hosting node 10 is unable to modify the hypervisor 12, except when needed in order to apply service provided by the manufacturer. For example, the hypervisor 12 may be provided as part of a "Licensed Internal Code (LIC)" and/or microcode for the hosting node 10.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The hosting node 10 may further include a display controller 125 coupled to a user interface or display 130. In some embodiments, the display 130 may be an LCD screen. In other embodiments, the display 130 may include a plurality of LED status lights. In some embodiments, the hosting node 10 may further include a network interface 160 for coupling to a network 165. The network 165 may be an IP-based network for communication between the hosting node 10 and an external server, client and the like via a broadband connection. In an embodiment, the network 165 may be a satellite network. The network 165 transmits and receives data between the hosting node 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The client device 20A may request the hypervisor 12 to deploy the corresponding virtual machine 15A with access to specific hardware and/or software components of the hosting node 10. For example, the client device 20A may request that the virtual machine 15A have access to a predetermined number of processors, a predetermined amount of volatile memory (such as random access memory (RAM)), a predetermined amount of non-volatile memory (such as storage space), or any other hardware components. Alternatively or in addition, the client device 20A may request that the virtual machine 15A have access to specific hardware components such as electronic circuitry identified by corresponding unique identifier. For example, the client device 20A may request that the virtual machine 15A have access to a specific type of a processor, a co-processor, a network card, or any other chip or electronic circuitry. In an example, the client device 20A may identify the electronic circuitry using an identifier provided by a manufacturer of the electronic circuitry. In an example, the identifier may be used in conjunction with a version identifier. Alternatively or in addition, the client device 20A may request that the virtual machine 15A have access to specific software components such as an operating system, an application, a basic input/output system (BIOS), a boot image, or any other software component. The software components requested may include firmware and embedded programs in the hardware components of the hosting node 10. The client device 20A may identify the software components requested using respective unique identifiers provided by developers/manufacturers of the respective software components. In an example, the identifiers may be used in conjunction with version identifiers of the software components.

As noted earlier, for a virtual machine 15A to be a secure VM, access to portion(s) of memory 110, storage 120, registers, and any other data associated with the virtual machine 15A by all non-secure guests and the hypervisor 12 is prohibited. In one or more examples, the hypervisor 12 guarantees that for any given resident secure guest page the associated host absolute address is only accessible through a single hypervisor (host) DAT mapping. That is, there is a single host virtual address that maps to any given host absolute address assigned to the secure VM 15A. Further, the hypervisor DAT mapping (host virtual to host absolute) associated with any given secure guest page does not change while it is paged-in. Further yet, the host absolute page associated with any secure guest page is mapped for only a single secure guest. Additionally, there is no sharing of memory/registers between the virtual machines 15, particularly in case of secure VM 15A. Further, in one or more examples, the hypervisor 12 allocates a secure portion of the storage 120 to the secure interface control 11. This secure portion of the storage 120 is accessible by the secure interface control 11 only, once allocated. None of the virtual machines 15 and/or the hypervisor 12 can access contents of the secure portion once it has been allocated to the secure interface control 11.

Any attempted violation to these rules is prohibited by the secure interface control 11 and the hosting node 10, and can raise an alarm. The alarm can be raised by sending a notification to one or more personnel, blocking operation of the hosting node 10, blocking requests from one or more client devices 20, blocking operation of the secure VM 15 (and any other secure VM), and the like.

Figure 5:
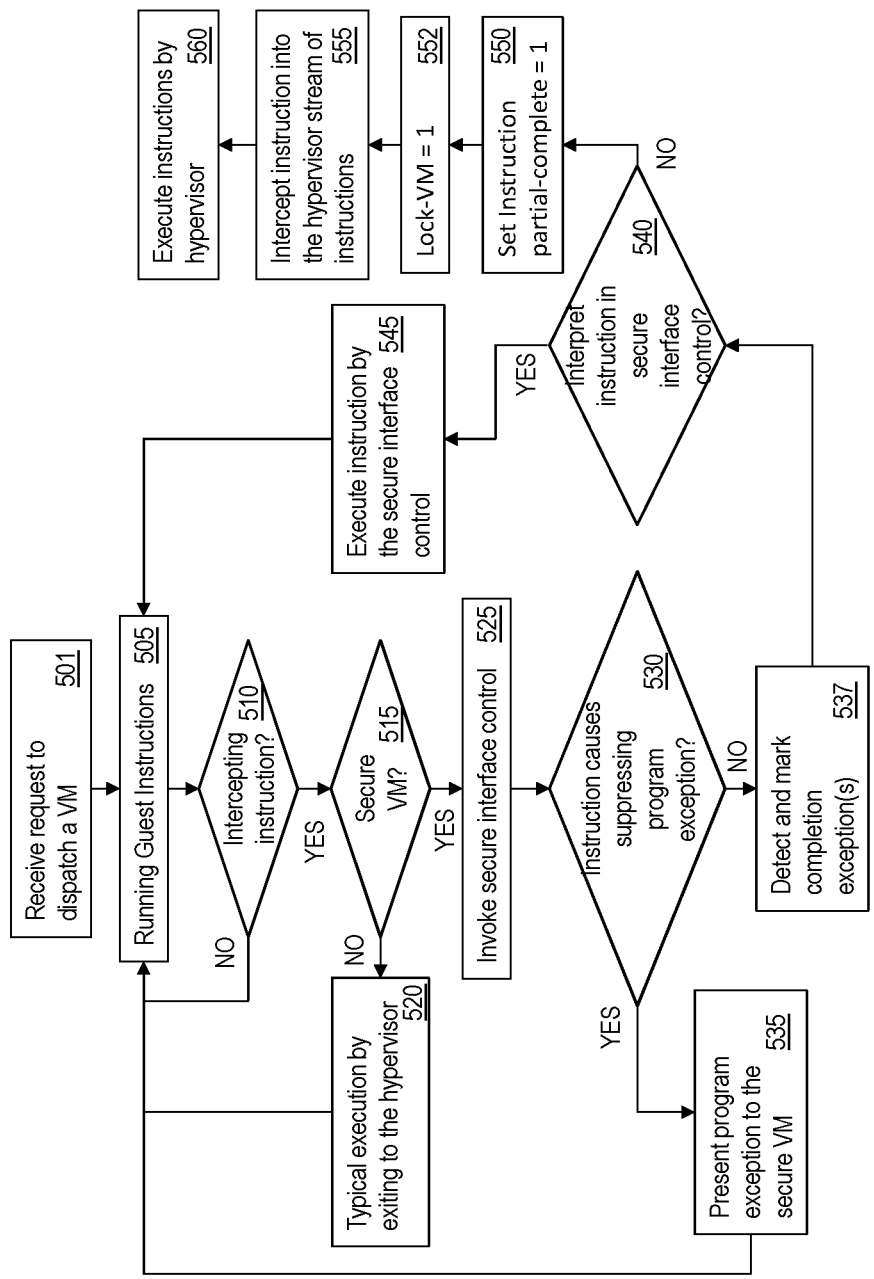
FIG. 5 illustrates a flowchart of an example method for a transparent interpretation of guest instructions in secure virtual machine environment according to one or more embodiments of the present invention.

FIG. 5 illustrates a flowchart of an example method for a hypervisor to perform transparent interpretation of guest instructions from a secure VM according to one or more embodiments of the present invention. The method can include receiving a request for initiating the secure VM 15A from a client device 20A, at 501. In one or more examples, the request may be received from any other source, such as another VM 15B-15N, a computer application being executed by the hypervisor 12, an administrator, and the like.

The method includes creating a non-secure state descriptor (SD) for the secure VM 15A. In one or more examples, the non-secure SD includes a reference to a secure SD that is stored in a portion of the memory that is not accessible by the hypervisor 12 or other non-secure entity. For example, the secure interface control 11 creates the secure SD and adds a reference to the secure SD in the non-secure SD. The secure SD can include the VM general registers (GRs), access registers (ARs), control registers (CRs), VM timers (including clock comparator and CPU timer), VM prefix register, virtual CPU number (VCN), program-status word (PSW) and instruction address (IA). In addition, the SD can include control information such as interception control (IC) bits to indicate if certain instructions (e.g., Load Program Status Word (LPSW), Invalidate Page Table Entry (IPTE), and the like) require interception to the host or if purging of the VM translation lookaside buffer (TLB) is required before VM instruction execution can begin. The SD fields described above are exemplary, and can be different in one or more embodiments of the present invention, for example including miscellaneous other fields for other VM states. In case of a non-secure VM, the non-secure SD itself includes the above fields/parameters described as part of the secure SD in case of a secure VM.

The hypervisor 12 issues an SIE instruction with the non-secure SD as an operand, execution of the instruction being handled by the secure interface control 11. The SIE (start interpretive execution) instruction is used for dispatching a VM 15 and allocating a processor(s) 105 and other computing resources to the VM 15. The SIE instruction puts the processor 105 into an emulation state defined in the non-secure SD. In case of the secure VM, the secure SD is accessed to initiate the dispatch of the secure VM 15A. In one or more examples, the non-secure SD includes an identifier to indicate whether the VM being dispatched is secure/non-secure and accordingly, the secure interface control 11 accesses the fields/parameters from the appropriate secure/non-secure portion of the memory.

The method further includes executing guest instructions in the secure VM 15A, at 505. Until an instruction is encountered that causes an intercept condition, the instruction stream in the secure VM 15A can continue execution, at 510. Once an instruction causes an intercept condition, the VM with the intercepting instruction determines if the VM has been dispatched as a secure VM, at 510 and 515.

If the VM is dispatched as a non-secure VM, where the hypervisor 12 can access the data and/or memory associated with the VM, the execution of the intercepting instruction proceeds as in existing solutions, at 520. The secure interface control determines whether it has been dispatched as a secure or a non-secure VM based on a state flag stored in the SD of the VM.

In the case the VM is a non-secure VM, the execution of the instruction stream in the non-secure VM is paused, and the control is transferred to the hypervisor 12, which interprets the intercepting instruction by accessing data of the non-secure VM by accessing the SD of the non-secure VM directly. For example, the data used by the hypervisor 12 can include values that are stored in GRs, CRs, guest memory, and/or other registers of the non-secure VM. Once the intercepted instruction interpretation is complete, the hypervisor 12 updates the guest state appropriately by storing one or more values in response. For example, the hypervisor 12 stores updated values into the one or more registers of the non-secure VM directly, by updating these values in the memory locations where the SD of the non-secure VM is maintained. Hypervisor 12 may also update guest memory as part of the instruction interpretation.

Alternatively, if the VM is a secure VM 15A, the secure interface control 11 is invoked to execute the intercepting instruction, at 525. The secure interface control 11 determines if the instruction should cause a suppressing or nullifying program exception due to the execution, at 530. The secure interface control 11 simulates execution of the intercepting instruction to determine whether the execution would cause a program exception. For example, the instruction can request a computing resource that is not available in the hosting node 10. Alternatively, or in addition, the intercepting instruction can be an instruction that is not allowed at the privilege level at which the secure VM 15A is executing. Alternatively, or in addition, the intercepting instruction can violate a boundary condition during a memory access. The secure interface control 11 can check for any other types of program exception that would be caused by the execution of the intercepting instruction. If an exception occurs due to the execution of the intercepting instruction, the secure interface control 11 presents the exception to the secure VM 15A, at 535.

In one or more examples, the instruction is suppressed or nullified depending on the type the program interruption. The instruction interception does not reach the hypervisor 12 if a suppressing or nullifying guest exception applies, instead the control is given directly to an interrupt handler of the secure VM 15A to handle the program exception. There is no reason to intercept the instruction to the hypervisor because the program exception has to be handled first. For example, if LCTLG instruction is to be intercepted and a storage operand provided to the instruction has a page fault, a program exception is given to secure VM 15A to resolve the page fault first. Once the page fault is resolved, the LCTLG is executed again, this time without a program exception. Accordingly, in the subsequent execution, the instruction is intercepted to the hypervisor 12 using features described herein.

Some program exceptions are host related. In such a case, SIE exit is invoked and the program exception is presented to the hypervisor 12. For example, it the case of a host page fault, the hypervisor 12 maps the guest page to a host absolute page and it then re-dispatches the VM.

It should be noted that program exceptions can be nullifying, suppressing and completing. The difference between suppressing or nullifying is in the way the Instruction Address (IA) is updated. In a nullifying exception, the IA points to the instruction that caused the exception, whereas in a suppressing exception, the IA points to next-sequential instruction after the one with the exception. In both cases, no other update is made to the guest state or memory.

Alternatively, if the intercepting instruction results in a completing exception, the secure interface control 11 detects and marks a completion exception(s) flag for the intercepting instruction, at 537 Completing exceptions like Program Event Recording (PER) are typically presented after the completion of the associated instruction. In a non-secure VM environment, the hypervisor 12 detects such PER exceptions and presents them to the VM once the hypervisor 12 finishes interpreting the guest instruction. In the secure VM environment, the secure interface control 11 detects such PER program exceptions, marks them to be presented to the secure VM once the guest instruction is finished executing.

Further, the secure interface control 11 checks which instruction is being intercepted, at 540. For example, the secure interface control 11, based on the instruction to be intercepted and, is come cases, one of more operands of the instruction determines if the instruction can be interpreted by the secure interface control 11 itself. Some operations such as writing a guest control register that may enable guest asynchronous interrupts (e.g., a LCTLG instruction) are typically completed by the secure interface control and then intercepted, providing minimally required guest state, to the hypervisor 12 so that the hypervisor 12 can check if any previously active but disabled guest interrupt becomes enabled. The hypervisor 12 then prioritizes and pending and enabled guest interrupts and presents the highest priority interruption securely to the guest through the secure interface control. According to one or more embodiments of the present invention, in a secure VM environment, the secure interface control 11 interprets the LCTLG interpretation on behalf of the secure VM. Similarly, for a Set Prefix (SPX) instruction that intercepts back to the hypervisor 12 for a non-secure VM, in one or more embodiments of the present invention, will be interpreted by the secure interface control 11. If the operands are accessible by the secure interface control 11, the instruction can be deemed interpretable by the secure interface control 11. If the instruction is interpretable by the secure interface control 11, the instruction execution is completed by the secure interface control 11 itself, and the instruction stream of the secure VM 15A is resumed, at 545.

If the instruction is not interpretable by the secure interface control 11 itself, the secure interface control 11 sets a partial-completion flag associated with the guest instruction to a first state, for example, partial-completion=1, at 550. It is understood that although the partial-completion flag is described to have a first state=1 and a second state=0 in the present document, other values can be used for the two states in one or more embodiments of the present invention.

Further, the secure interface control 11 sets a lock-VM flag associated with the secure VM 15A that includes the intercepting instruction to a first state, for example, lock-VM=1, at 552. It is understood that although the lock-VM flag is described to have a first state (e.g. =1) and a second state (e.g. =0) in the present document, other values can be used for the two states in one or more embodiments of the present invention. The lock-VM flag is indicative to whether the secure VM 15A is "locked", that is, execution of the instruction stream is paused, waiting for interpretation of an instruction to complete. The lock-VM flag is also indicative of whether the hypervisor response to the intercepted instruction, being forwarded to the secure VM 15A by the secure control interface, has been validated. In the examples described herein, it is considered that in the first state (i.e. lock-VM=1), the response to the secure VM 15A is to be validated, and otherwise (i.e. lock-VM=0) the response does not have to be validated at this time. The lock-VM also prevents the hypervisor 12 from dispatching the secure VM accidently or maliciously without a response and also prevents from attempts by the hypervisor to inject an interrupt into the secure VM 15A before completion of the instruction interpretation. The lock-VM, accordingly, locks the secure VM 15A until it receives the response required for the guest instruction that is being interpreted.

When the secure VM 15A is in a locked state, it is indicative to the secure interface control 11 that the secure VM 15A is waiting for a response from the hypervisor 12 related to the instruction interpretation. The secure interface control 11, in such a case prevents the secure VM 15A from being dispatched until a valid response is received by the secure interface control, in which case the state of the lock-VM flag is changed.

The secure interface control 11, further, intercepts an instruction for the hypervisor 12 to execute, at 555. The interception to the hypervisor 12 includes the secure interface control 11 extracting one or more parameter data associated with the instruction from the secure portion of the memory and making it accessible to the hypervisor 12. The secure interface control 11 can extract the parameter data from the secure VM 15A by examining the instruction, its operand and its data. The operand and data can be stored in hardware registers and memory associated with the secure VM 15A. In a SIE exit, the guest state is saved in the secure SD and the interception reason (and other hypervisor related info) are saved in the non-secure SD. The physical processor where the VM was running is now free and the hypervisor may re-dispatch the same VM or dispatch a new VM to the same physical processor. The lock-VM and other information related to the intercepted guest instruction are saved in the secure SD allowing the dispatch of the VM to any available processor.

The secure interface control 11 can make the extracted parameters accessible to the hypervisor 12 by creating a dedicated buffer for execution of this particular instruction or using a dedicated buffer that is used for executing such intercepted guest instructions. The secure interface control 11 stores the data (required by the hypervisor for the instruction interpretation) from the secure VM 15A in the dedicated buffer and passes the stored data to the hypervisor 12 as the operands/data to be used for interpretation of the guest instruction that is being intercepted.

The hypervisor 12 is often unaware exactly which instruction from an instruction stream in the secure VM 15A causes the interception—only the specific action which is required on their part. Upon the interception, the hypervisor 12 is scheduled to execute the instruction interpretation without any other context outside of that which is required for interpretation, such as the cause of the instruction being executed. Accordingly, the hypervisor 12 interprets the instruction without knowledge about the source/cause of the instruction, at 560.

Figure 6:
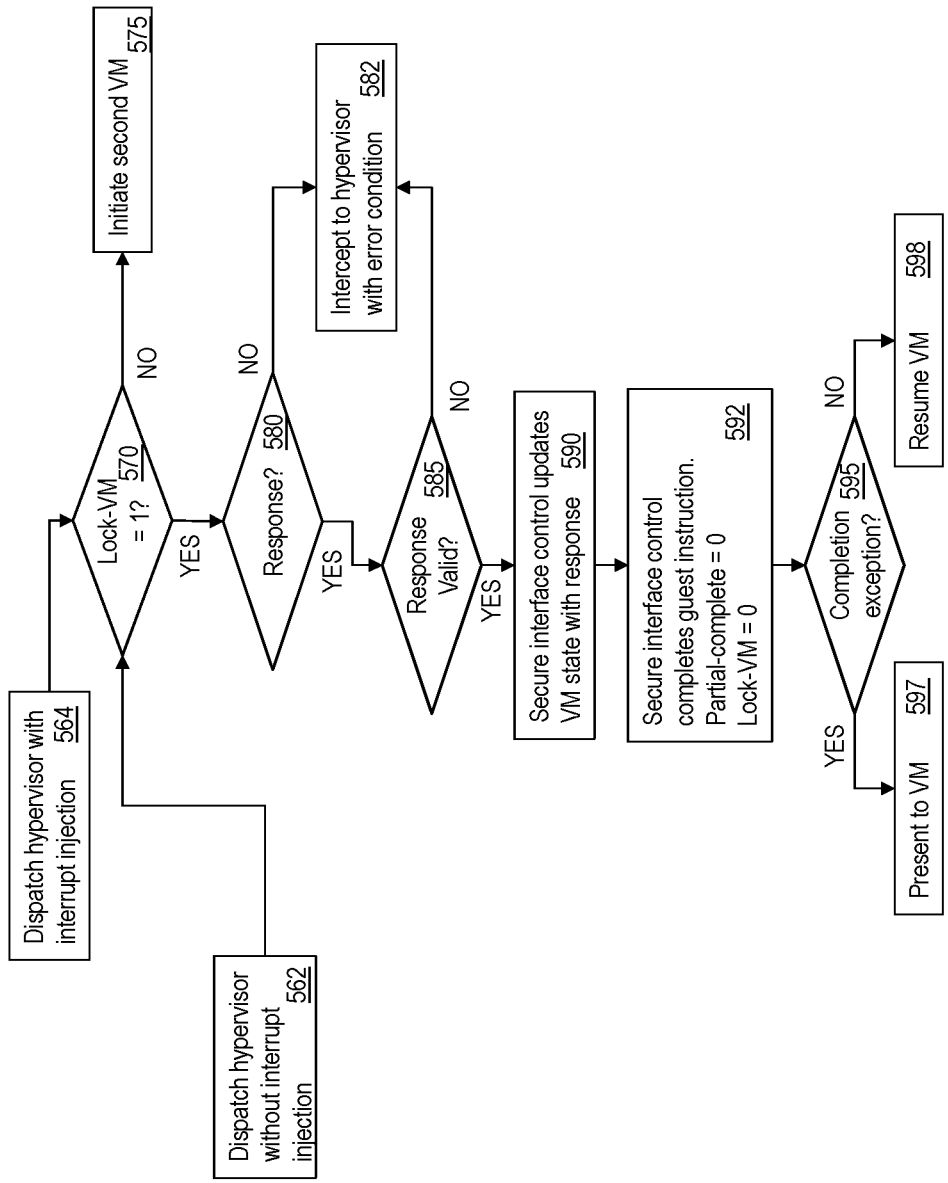
FIG. 6 depicts a flowchart of an example method for a transparent interpretation of guest instructions in secure virtual machine environment according to one or more embodiments of the present invention.

FIG. 6 depicts a flowchart for a method to return a response from a hypervisor to a secure VM after completing interpretation of an intercepted secure VM instruction according to one or more embodiments of the present invention. Upon completion of the instruction interpretation, the hypervisor 12 dispatches the secure VM, either without any interrupt injection (562) or with an interrupt injection (564). The dispatch can be performed using the SIE instruction as described herein. As part of the secure VM dispatch operation, the guest state is read from the secure SD associated with the VM and loaded to the processor hardware (registers, memory etc.). The hypervisor 12 injects the interrupt into the VM via the secure interface control 11 by storing the interrupt parameter related information, such as identifier, and parameters in the dedicated buffer, in one or more examples. The secure interface control 11 receives control of the execution with the SIE invocation.

The secure interface control 11 checks if the lock-VM flag is set to 1, at 570. If lock-VM=0 (or not equal to 1), the secure interface control 11 deems that a different VM (without intercepting instruction) is being dispatched by the SIE instruction that is invoked and accordingly, the different VM is entered and execution of an instruction stream for that VM is initiated, at 575.

Alternatively, if the lock-VM=1, that is the hypervisor 12 is returning control of execution to the secure VM 15A that issued the intercepting instruction, the secure interface control 11 checks if a response to the instruction is received from the hypervisor 12, at 580. The secure interface control 11 makes the determination by checking a designated location in the dedicated buffer that was setup for the hypervisor 12 to provide the instruction response. If a response is not found, the secure interface control 11 intercepts to the hypervisor 12 with an error condition, at 582. If a response is provided in the dedicated buffer, the secure interface control 11 ensures that the response is valid, at 585. If the response is invalid, the secure interface control 11 intercepts to the hypervisor 12 with an error condition, at 582.

In one or more examples, the secure interface control 11 ensures validity of the response based on the type of response received from the hypervisor. For example, that the provided response is valid for the instruction type that intercepted. Accordingly, for each of the intercepting instruction allowed, the secure interface control 11 has one or more possible types of responses allowed. For example, the secure interface control 11 checks that the data type of the response is valid from a list of expected response types for the intercepting instruction. For example, if the intercepting instruction is a request for an I/O operation, the secure interface control 11 performs a check to verify that the response is of a data type appropriate for and I/O operation.

If the response is determined to be valid, the method proceeds with the secure interface control 11 updating the state of the secure VM 15A based on the response from the hypervisor 12, at 590. Updating the state can include updating the registers and memory associated with the secure VM 15A. Only the secure interface control 11 can access the SD for the secure VM 15A because it is stored in the secure portion of the memory that is accessible only by the secure interface control 11. Accordingly, the response stays secure and inaccessible from other VMs as well as the hypervisor 12.

Further, the secure interface control 11 completes execution of the intercepting guest instruction, at 592. The completion includes the secure interface control 11 updating the flags partial-complete and lock-VM to the second states, that is, set partial-complete=0 and lock-VM=0, for the secure VM 15A. The secure interface control 11 determines if the intercepting instruction had a corresponding completion exception associated with it, at 595. If an exception exists, the secure interface control 11 presents the completion exception to the secure VM 15A, which indicates the secure VM 15A to resume the instruction stream that it was executing, at 597 after handling the exception. Alternatively, if a program exception does not exist for the intercepting instruction, the secure interface control 11 returns the control of execution to the secure VM 15A, which in turn resumes the instruction stream, at 598.

Accordingly, one or more embodiments of the present invention facilitate interpreting, by a hypervisor in a host node, guest instructions for a secure VM. The guest instruction is intercepted as normal (as in a non-secure VM) but control is not given back immediately to the hypervisor, instead is given to the secure interface control. The secure interface control extracts the guest data and passes it along with the interception reason to the hypervisor. The hypervisor processes the request and returns back the response to the secure interface control.

The secure interface control checks for program exception including Program-Event-Recording (PER) and marks the guest instruction as partially completed before passing the request to the hypervisor. In the presence of a nullifying or suppressing program interception, the signaling to hypervisor is not done and a program exception is taken. The secure interface control also checks and verifies the hypervisor response before updating the guest instruction results. For a completion type program exception like a Program Event Recording (PER), the secure interface control marks that the instruction has a completion program exception and upon return from hypervisor, the secure interface control completes the instruction and forces the program interrupt.

Between the times the secure VM intercepts to the hypervisor and the time of the hypervisor responds, the secure interface control prevents the hypervisor from dispatching the same VM to any physical CPU. It also prevents the hypervisor from injecting interrupts (TO, external or a machine check) or exceptions (e.g. program exceptions) into the secure VM until the partially completed instruction is fully completed.

According to one or more embodiments of the present invention a computer server can host secure VMs that prohibit a hypervisor from accessing memory, registers, and other data associated with the secure VMs, without having to change the hypervisor and/or the secure VM code/architecture to intercept instructions into the hypervisor and/or to inject responses into the secure VMs. Instead, according to one or more embodiments of the present invention a secure interface control that includes millicode, facilitates securing data using an improved structure of a state descriptor and secure portion of the storage/memory. In addition, the secure interface control stores data from the VM state so that in case one or more parameters are to be made accessible to the hypervisor, the secure interface control (millicode) can do so.

One or more embodiments of the present invention are rooted in computer technology, particularly virtual machine hosting computer servers. Further, one or more embodiments of the present invention facilitate an improvement to the operation of computing technology itself, in particular virtual machine hosting computer servers, by facilitating the computer servers that host VMs to host secure VMs, in which even the hypervisor is prohibited from accessing memory, registers, and other such data associated with the secure VM. In addition, one or more embodiments of the present invention provide significant steps towards the improvements of the VM hosting computing servers by using a secure interface control that includes millicode to facilitate a separation of the secure VM and the hypervisor, and thus maintaining security of the VMs hosted by the computing server. The secure interface control provides lightweight intermediate operations to facilitate the security, without adding substantial overhead to securing VM state during initialization/exit of VMs as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method comprising:
   executing, by a virtual machine that is executing on a host server, a stream of instructions, wherein an instruction from the stream of instructions is to be intercepted to a hypervisor;
   based on a determination that the virtual machine is a secure virtual machine, preventing the hypervisor from directly accessing any data of the secure virtual machine; and
   performing by a secure interface control of the host server:
      based on a determination that the instruction is not interpretable by the secure interface control itself:
         extracting, by the secure interface control, one or more parameter data associated with the instruction from the secure virtual machine;
         storing, by the secure interface control, the one or more parameter data into a buffer that is accessible by the hypervisor; and
         intercepting, by the secure interface control, the instruction into the hypervisor.

2. The computer implemented method of claim 1, wherein based on a determination that the instruction is interpretable by the secure interface control itself:
   executing the instruction by the secure interface control; and
   returning execution control back to the secure virtual machine for continuing execution of the stream of instructions.

3. The computer implemented method of claim 1, wherein intercepting the instruction further comprises:
   setting, by the secure interface control, a first flag that is indicative that the instruction is partially complete; and
   setting, by the secure interface control, a second flag that is indicative that the secure virtual machine is in a locked state for execution.

4. The computer implemented method of claim 3, wherein the secure interface control prevents dispatching the secure virtual machine in the locked state, the locked state indicative that the secure virtual machine is waiting for a response from the hypervisor.

5. The computer implemented method of claim 1, further comprising:
   based on a determination by the secure interface control that the instruction causes a program exception when executed, presenting the exception to the secure virtual machine.

6. The computer implemented method of claim 1, further comprising:
   upon completion of execution of the instruction by the hypervisor, updating, by the secure interface control, a state of the secure virtual machine with a response from the hypervisor, at least a portion of the state being stored in a secure portion of memory that is not accessible by the hypervisor.

7. The computer implemented method of claim 6, wherein the hypervisor stores the response for the instruction in a dedicated buffer.

8. The computer implemented method of claim 6, further comprising:
   upon completion of the execution, based on a determination that the response generated by the hypervisor is not valid, intercepting, by the secure interface control, an error condition to the hypervisor.

9. A system comprising:
   a memory;
   a secure interface control; and
   a processing unit coupled with the memory and the secure interface control, the processing unit configured to execute a hypervisor that hosts a plurality of virtual machines, the hypervisor prohibited from directly accessing any data of a secure virtual machine, and wherein the hypervisor is configured to perform a method to interpret one or more guest instructions from the virtual machines, the method comprising:
      executing, by a virtual machine, a stream of instructions, wherein an instruction from the stream of instructions has to be intercepted to a hypervisor;
      determining that the virtual machine is a secure virtual machine; and
      performing by the secure interface control:
         based on a determination that the instruction is not interpretable by the secure interface control itself:
            extracting, by the secure interface control, one or more parameter data associated with the instruction from the secure virtual machine;
            storing, by the secure interface control, the one or more parameter data into a buffer that is accessible by the hypervisor; and
            intercepting, by the secure interface control, the instruction into the hypervisor.

10. The system of claim 9, wherein based on a determination that the instruction is interpretable by the secure interface control itself:
    executing the instruction by the secure interface control; and returning execution control back to the secure virtual machine for continuing execution of the stream of instructions.

11. The system of claim 9, wherein intercepting the instruction further comprises:
   setting, by the secure interface control, a first flag that is indicative that the instruction is partially complete; and
   setting, by the secure interface control, a second flag that is indicative that the secure virtual machine is locked for execution.

12. The system of claim 9, wherein the method further comprises:
   based on a determination by the secure interface control that the instruction causes a program exception when executed, presenting the exception to the secure virtual machine.

13. The system of claim 9, wherein the method further comprises:
   upon completion of execution of the instruction by the hypervisor, updating, by the secure interface control, a state of the secure virtual machine with a response from the hypervisor, at least a portion of the state being stored in a secure portion of memory that is not accessible by the hypervisor.

14. The system of claim 13, wherein the hypervisor stores the response for the instruction in a dedicated buffer.

15. The system of claim 13, wherein the method further comprises:
   upon completion of the execution, based on a determination that the response generated by the hypervisor is not valid, intercepting, by the secure interface control, an error condition to the hypervisor.

16. A computer program product comprising a computer readable storage medium, the computer readable storage medium comprising computer executable instructions, which when executed by a processing unit causes the processing unit to perform a method comprising:
   executing, by a virtual machine that is executing on a host server, a stream of instructions, wherein an instruction from the stream of instructions has to be intercepted to a hypervisor;
   determining that the virtual machine is a secure virtual machine, the hypervisor prevented from directly accessing any data of the secure virtual machine; and
   performing by a secure interface control of the host server:
      based on a determination that the instruction is not interpretable by the secure interface control itself:
         extracting, by the secure interface control, one or more parameter data associated with the instruction from the secure virtual machine;
         storing, by the secure interface control, the one or more parameter data into a buffer that is accessible by the hypervisor; and
         intercepting, by the secure interface control, the instruction into the hypervisor.

17. The computer program product of claim 16, wherein based on a determination that the instruction is interpretable by the secure interface control itself:
   executing the instruction by the secure interface control; and
   returning execution control back to the secure virtual machine for continuing execution of the stream of instructions.

18. The computer program product of claim 16, wherein the method further comprises:
   upon completion of execution of the instruction by the hypervisor, updating, by the secure interface control, a state of the secure virtual machine with a response from the hypervisor, at least a portion of the state being stored in a secure portion of memory that is not accessible by the hypervisor.

19. The computer program product of claim 18, wherein the hypervisor stores the response for the instruction in a dedicated buffer.

20. The computer program product of claim 18, wherein the method further comprises:
   upon completion of the execution, based on a determination that the response generated by the hypervisor is not valid, intercepting, by the secure interface control, an error condition to the hypervisor.

21. A computer-implemented method comprising:
   executing, by a hypervisor on a host machine, a guest instruction from a secure virtual machine, the hypervisor prohibited from directly accessing any data of the secure virtual machine;
   storing, by the hypervisor, a response to the guest instruction in a predetermined buffer; and
   updating, by a secure interface control of the host machine, a state descriptor of the secure virtual machine with the response by copying the response into a designated register in the state descriptor, the state descriptor being stored in a secure portion of memory that is not accessible by the hypervisor.

22. The computer-implemented method of claim 21, further comprising:
   based on a determination that the response generated by the hypervisor is not valid, intercepting, by the secure interface control, an error condition to the hypervisor.

23. A system comprising:
   a memory;
   a secure interface control; and
   a processing unit coupled with the memory and the secure interface control, the processing unit configured to execute a hypervisor that hosts a plurality of virtual machines, the hypervisor prohibited from directly accessing any data of a secure virtual machine, and wherein the hypervisor is configured to perform a method to interpret one or more guest instructions from the virtual machines, the method comprising:
      executing, by the hypervisor, a guest instruction from the secure virtual machine, the hypervisor prohibited from directly accessing any data of said secure virtual machine;
      storing, by the hypervisor, a response to the guest instruction in a predetermined buffer; and
      updating, by the secure interface control, a state descriptor of the secure virtual machine with the response by copying the response into a designated register in the state descriptor, the state descriptor being stored in a secure portion of memory that is not accessible by the hypervisor.

24. The system of claim 23, wherein the method further comprises:
   based on a determination that the response generated by the hypervisor is not valid, intercepting, by the secure interface control, an error condition to the hypervisor.

25. The system of claim 24, wherein the method further comprises:
   resetting, by the secure interface control, a first flag associated with the secure virtual machine, the reset is indicative that the secure virtual machine can be dispatched to continue execution of an instruction stream.

\* \* \* \* \*